Nov. 6, 1923. Re. 15,717
J. S. NICHOLS
HEATING DEVICE FOR OPEN FIREPLACES
Original Filed June 7, 1919 2 Sheets-Sheet 1
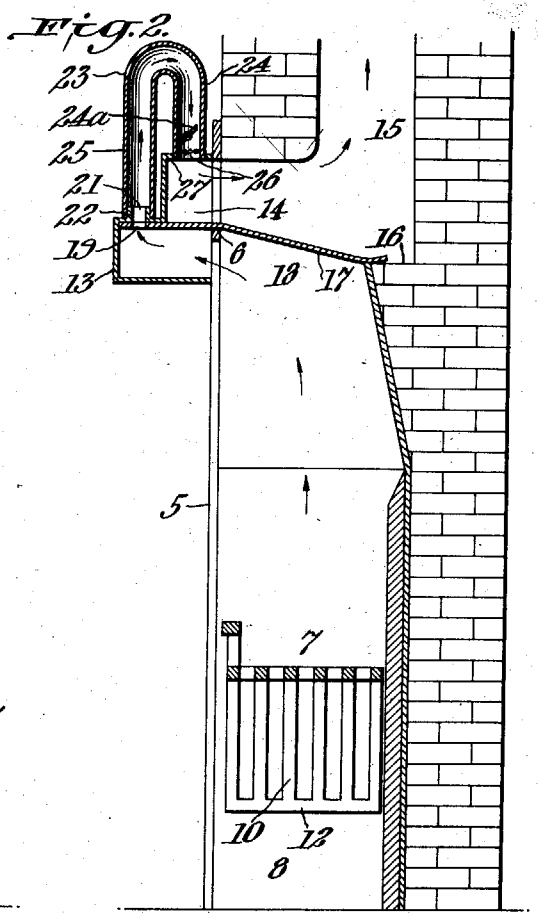
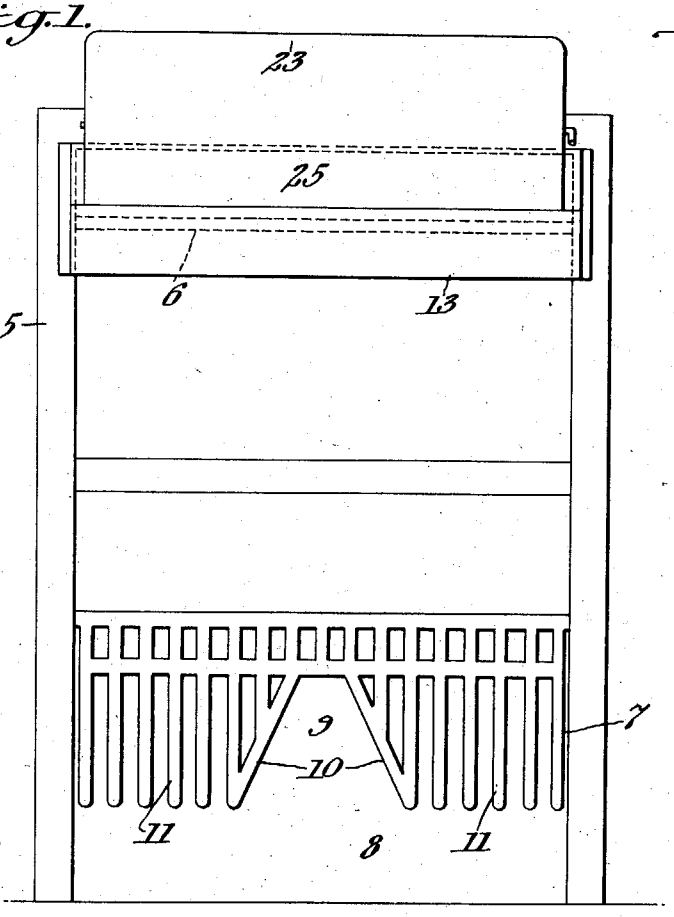
Inventor:
James S. Nichols,
By Byrne, Townsend & Brickenstein,
Attorneys Nov. 6, 1923. Re. 15,717

J. S. NICHOLS

HEATING DEVICE FOR OPEN FIREPLACES

Original Filed June 7, 1919 2 Sheets-Sheet 2

Inventor.

James S. Nichols,

By Byrne, Townsend & Brickenstein,

Attorneys.

Reissued Nov. 6, 1923. Re. 15,717

UNITED STATES PATENT OFFICE.

JAMES S. NICHOLS, OF ATLANTA, GEORGIA, ASSIGNOR TO NIC-HEATER CORPORATION, OF ATLANTA, GEORGIA, A CORPORATION OF GEORGIA.

HEATING DEVICE FOR OPEN FIREPLACES.

Original No. 1,370,348, dated March 1, 1921, Serial No. 302,456, filed June 7, 1919. Application for reissue filed March 1, 1923. Serial No. 622,210.

*To all whom it may concern:*

Be it known that I, JAMES S. NICHOLS, a citizen of the United States, residing at Atlanta, in the county of Fulton and State of Georgia, have invented new and useful Improvements in Heating Devices for Open Fireplaces, of which the following is a specification.

This invention relates to heating devices for rooms, apartments and the like and particularly to an open grate heater, and the primary object of the invention is to provide a heating device of the class specified adapted to be readily arranged in a fire place and in operation having a relatively high heating efficiency.

A further object of the invention is to provide a novel structure embodying means for utilizing the heat of the products of combustion which are caused to circulate or to pass therethrough to a smoke outlet or chimney from a grate, and to so expose the heat conducting components of the improved heating device as to practically heat a room or apartment with material economy in the use of fuel.

A still further object of the invention is to provide a heating means of the class specified arranged for the circulation of products of combustion and gases from a grate therethrough and to prevent burning paper and other material that may be carried up toward the chimney or smoke outlet from passing into the latter and thereby preventing ignition of soot or other deposits within the chimney. With these and other objects and advantages, the invention consists in certain improvements embodying the construction and arrangement of parts which will be hereinafter more fully described and claimed.

In the drawings:—

Figure 1 is a front elevation of a fire place showing the improved open grate heater mounted therein.

Fig. 2 is a transverse vertical section taken through a portion of a fire place and chimney and the improved open grate heater.

Figure 3:
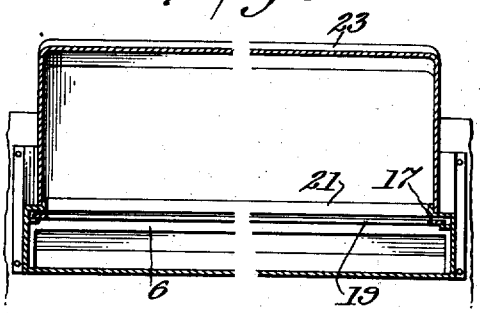
Figs. 3, 4, 5 and 6 are detail views of different parts of the improved heater.
Figure 4:
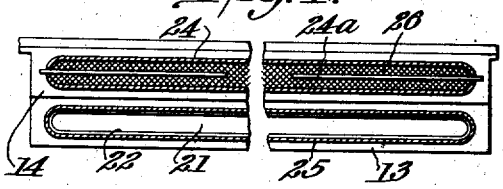
Figure 5:
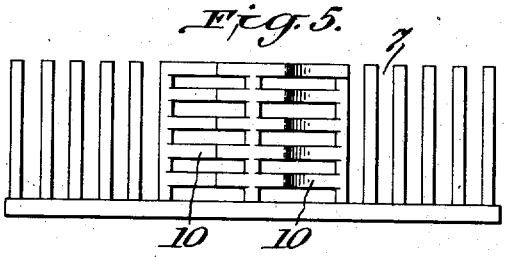
Figure 6:
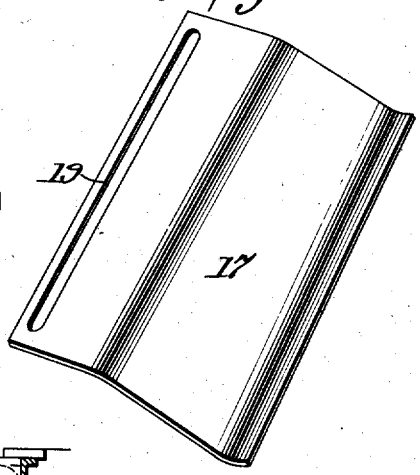
Figure 9:
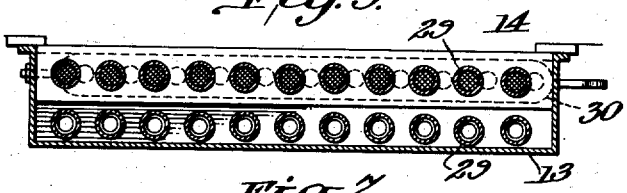
Fig. 9 is a horizontal section of a portion of the modified structure shown in Figs. 7 and 8 taken in the plane of the line 9—9, Fig. 8, and particularly illustrating a heat damper or cut-off.

The open grate heater embodying the features of the invention obviate certain disadvantages found to exist in using the common form of open grate heaters and fire places, by avoiding principally the escape of smoke and gasses into the room or apartment where it is installed. The improved heater also provides means for efficiently controlling the combustion of the fuel and the utilization of the products of combustion by radiation of the heat thereof as a heating means instead of allowing such products to immediately pass off into the chimney or smoke outlet. The preferred embodiment of the invention is shown in the accompanying drawings, but it will be understood that it is not restricted to the precise construction shown, as equivalent parts are contemplated and will be included within the scope of the claims.

The improved open grate heater comprises a frame 5 which is arranged around the fire place as particularly shown by Fig. 1 and is provided with a cross bar 6 a short distance below the top for a purpose which will be hereinafter explained, and also with a basket grate 7 held within the fire place 8, and connected to the lower portion of the frame at a suitable distance above the base of the fire place in any preferred manner.

The grate 7 is particularly constructed to reduce the charge of fuel necessary to fill the same relatively to that required to fill the ordinary form of basket grate and to provide for lateral draft through the fuel charge in opposite directions, as well as vertically and a more complete consumption of the fuel and a consequent economy in the use thereof with a comparatively greater heating efficiency relatively to a given amount of fuel. To adapt the improved grate to the advantageous services specified, it is formed with a central substantially triangular recess 9 opening through the front, bottom and rear parts thereof, said recess being formed by providing upwardly converging side grate bar sections 10 intersecting the usual front vertical and bottom horizontal sections 11 and 12 of the grate. It will be seen that this recess 9 and the converging disposition of the grate bars as explained exposes the charge of fuel at the center for draft purposes or entrance of the air thereinto.

The heat radiating organization of the improved structure comprises a main inclosure 13 which in the main is of box-like form and provided with a rear step or vertical extension 14 of less width than the main inclosure, the said main inclosure 13 being secured to the frame 5 over the cross bar 6, the upper or top portion of the vertical extension 14 terminating coincidentally with the top of the opening of the fire place which communicates as usual with an upper smoke flue or chimney 15 having a rear ledge 16 on which is secured the rear end of a baffle plate 17. This baffle plate extends upwardly and outwardly across the opening 18 between the extension 14 and the lower main inclosure 13 and rests on the bar 6 and has therein an opening 19 to permit the circulation of the products of combustion from the fire place into the improved heating device. It will be observed that the baffle plate 17 closes the fire place at the point where it extends thereover and prevents the products of combustion from passing from the grate upwardly into the chimney or smoke flue 15. The main inclosure 13 at the top and in advance of the extension 14 is formed with a top slot 21 having a surrounding upstanding flange 22, and in the form of the improved heating device as particularly shown by Figs. 1 to 6 inclusive, a radiating elbow 23 comprising a rear comparatively short member 24 and an outer longer member 25 is applied on the inclosure and extension. The outer longer member 25 of this radiating elbow 23 is open at the bottom and of such dimensions as to fit over and frictionally engage the flange 22 in a manner similar to the application of a stove pipe to a heating or cooking stove and the lower end of the shorter member 24 is in like manner open and is provided with a wire gauze screen 26 extending full length and width thereof, the lower open end of the shorter member 24 being fitted over an elongated slot or opening 27 in the top of the extension 14 and whereby circulating communication for the products of combustion is established between the lower main inclosure 13 and the top of the extension of the latter. The wire gauze partition or covering 26 prevents the passage of burning paper or similar material into the chimney or smoke flue 17 and thereby prevents ignition of the deposits in the said chimney or smoke flue, and also emission of burning products of combustion from the top of the chimney. The radiating elbow 23 and the main inclosure 13 stand out into the apartment a suitable distance beyond the front of the fireplace above the grate as shown particularly in Fig. 2 and the said elbow is preferably formed of sheet metal and continuous with such jointures of the parts thereof as may be necessary to produce the same in the form shown and described. The short member 24 of this elbow also has a damper 24ᵃ therein to regulate communication of the elbow with the extension.

Figure 7:
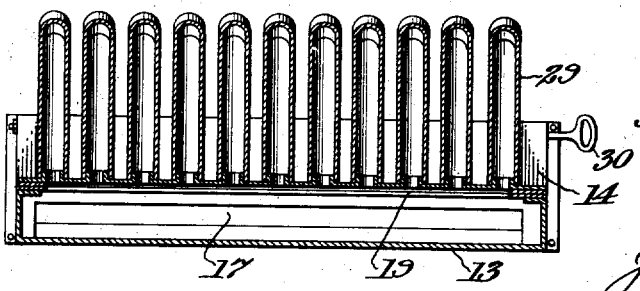
Fig. 7 is a section on the line 7—7, Fig. 8, showing a modification of a part of the heater.
Figure 8:
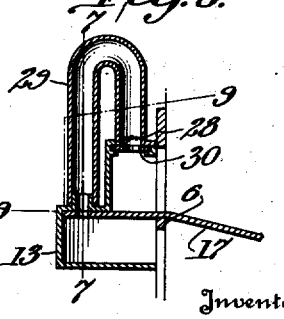
Fig. 8 is a transverse vertical section through the structure shown in Fig. 7.

As a slight modification of the elbow 23 of continuous form, openings or slots 21 and 27 respectively of the main inclosure 13 and extension 14 thereof may be replaced by a plurality of circular openings 28 as shown by Figs. 7 and 8, and instead of the continuous sheet metal radiating elbow 23, a series of separate elbow pipes 29 are provided and connected to the openings 28, and at a suitable distance below the openings 28 in the top of the extension 14, a suitable slide damper 30 is mounted and controls communication of the separate pipes 29 with the said main inclosure in a manner similar to the damper 24ᵃ. heretofore described. In the modified structure the baffle plate is used as in the first form described and is in all respects similar in construction thereto. It will be understood that all of the dampers are operable from the exterior of the drum and elbows.

In the operation of the improved heating device or attachment, the damper or slide between either the continuous sheet metal radiating elbow 23 or the modified structure of the latter consisting of the series of pipes 29 which also provides radiating elbow means is opened and the products of combustion including the heated gases rise from the grate 7 and pass into the rear open side of the main inclosure 13 and then upwardly through the opening or slot 21 or through the plurality of openings 28 in the modified structure, as the case may be, into either the elbow 23 or the series of pipes 29 and then into the top or upper side of the extension 14 and thence to and outwardly through the chimney or smoke flue 15. The said main inclosure and the elbow means are heated by the circulation of the products of combustion therethrough and the heat therefrom is radiated into the apartment with material advantages as a heating means and whereby the heat units of the fuel in the grate may be more fully and practically utilized. At any time the dampers between the lower or main inclosure 13 and the extension 14 may be regulated to control the circulation or passage of the products of combustion through the continuous elbow 23 or the elbow means comprising the series of pipes 29, and as heretofore explained, the wire gauze in the lower open end of the short member 24 of the elbow 23 will check or stop the passage of burning paper or other portions of the products of combustion into the chimney or smoke flue 15 and will thereby prevent them from passing out of the chimney in a flaming condition and avoiding fires by protecting roofs against engagement by such flaming products of combustion. The improved heating device as a whole may be readily applied in operative position. The baffle plate 17 in addition to serving as a partition means to exclude the direct passage of the products of combustion into the escape chimney or smoke flue will serve at times as a deflector to throw the heated air back or downwardly and out through the open portion of the fire place above the grate. All the parts of the improved device may be readily installed in operative position at a comparatively small expense, particularly when considered in a comparative sense relatively to the more complete utilization of the heat units of a given amount or charge of fuel deposited in the grate. The upper radiating elbow or elbow means is materially advantageous in heating the air adjacent thereto as the air may readily circulate between the front and rear portions thereof and become thoroughly heated.

It will be understood that the proportions, dimensions and minor details of the several parts of the heating attachment may be modified to adapt the same for application to fire places of different dimensions and form without in the least modifying the function of the components of the heating device or departing from the scope of the appended claims.

I claim:

1. In a heating device of the class specified, the combination with an open fire place having a chimney or escape passage and grate, of a baffle plate secured therein above the grate and extending outwardly beyond the front thereof to shut off direct communication with the chimney, a main heating inclosure projected outwardly from the upper part of the fire place and open at the rear and having an inner vertical extension closed to the lower main body of the main inclosure by the baffle plate which extends thereinto, elbow heat radiating means connected to the outer top portion of the drum and the top of the extension, and damper means between the outer portion of the drum and the elbow heat radiating means.

2. A heating device for application to an open fireplace above a grate, consisting of a main heating inclosure with an inner vertical extension of less width than the main inclosure, the main inclosure and its extension being fully open at the rear, the extension being separated from the main inclosure, elbow heat radiating means for circulation of the products of combustion therethrough connected to the outer top portion of the main heating inclosure and extending over and connected to the top of the said extension, and means for controlling communication between the main inclosure and the extension.

3. A heating device for application to an open fireplace above a grate, consisting of a main inclosure with an inner vertical extension, the inclosure and extension being open at the rear, elbow heat radiating means for circulation of the products of combustion therethrough connected to the outer top portion of the inclosure and to the top of the extension, a baffle plate extending into and separating the extension from the inclosure, and damper means between the elbow heat radiating means and the outer portion of the inclosure.

4. A heating device for application to an open fire place above a grate, consisting of a main inclosure with an extension at the inner part thereof extending above the top of the inclosure and providing an angular step construction, the inclosure and extension being fully open at the rear side and the opening being also primarily continuous with respect to the two parts, the extension being separated from the inclosure, elbow heat radiating means applied at one terminal to the top of the inclosure and extending upwardly and directed over and connected to the top of the extension for circulation of the products of combustion therethrough from the inclosure to the top of the extension, the part of the elbow heat radiating means connected to the top of the extension having a wire gauze screen between the same and the extension, and means for controlling communication between the inclosure and the elbow means.

5. A heating device for application to an open fireplace above a grate, consisting of a main inclosure disposed horizontally and of substantial rectangular shape and extending horizontally across the upper portion of the fireplace, the said inclosure being provided with an inner vertical extension and the inclosure and extension being primarily fully open at the rear, and elbow heat radiating means for circulation of the products of combustion therethrough connected to the outer top portion of the main inclosure and to the top of the extension, a space being formed between the front of the extension and the adjacent part of the elbow heat radiating means and also through said latter means, the part of the elbow heat radiating means connected to the top of the extension having a controlling damper therein, and a baffle plate extending outwardly from the fireplace into the main inclosure and cutting off communication between the said main inclosure and the extension.

6. In a heating device of the class described, the combination with an open fireplace having a chimney and a grate, of a baffle plate disposed between the grate and the chimney to shut off direct communication with the chimney, a portion of the baffle projecting outwardly beyond the front of the fireplace, enclosures on opposite sides of the projecting portion in communication with the fireplace and the chimney respectively, and heat radiating means between said enclosures.

7. In a heating device of the class described, the combination with an open fireplace having a chimney and a grate, of a baffle plate disposed between the grate and the chimney and having a substantially horizontal portion projecting outwardly beyond the front of the fireplace, an enclosure below the said projecting portion communicating with the fireplace, an enclosure above the said projecting portion communicating with the chimney, and heat radiating means between said enclosures, said radiating means extending upwardly from both enclosures.

8. In a heating device of the class described, the combination with an open fireplace having a chimney and a grate, of a baffle plate disposed between the grate and the chimney and having a substantially horizontal portion projecting outwardly beyond the front of the fireplace, an enclosure below the said projecting portion extending across the fireplace and in communication therewith, an enclosure above the said projecting portion extending across the fireplace and in communication with the chimney and a plurality of radiating elements between the said enclosures.

9. In a heating device of the class described, the combination with an open fireplace having a chimney and a grate, of a baffle plate disposed between the grate and the chimney and having a substantially horizontal portion projecting outwardly beyond the front of the fireplace, an enclosure below the said projecting portion and co-extensive therewith in communication with the fireplace, an enclosure above the said projecting portion disposed rearwardly of the front edge of said projection in communication with the chimney, and radiating means connected with the first enclosure through the said horizontal portion and with the upper portion of the second enclosure.

10. In a heating device of the class described, the combination with an open fireplace having a chimney and a grate, of a baffle plate disposed between the grate and the chimney and having a substantially horizontal portion projecting outwardly beyond the front of the fireplace, an enclosure below the said projecting portion and co-extensive therewith in communication with the fireplace, an enclosure above the said projecting portion disposed rearwardly of the front edge of said projecting portion in communication with the chimney and a plurality of radiating elements connected with the first enclosure through the said horizontal portion and with the upper portion of the second enclosure, said radiating elements having generally the form of an inverted U.

11. In a heating device of the class described, the combination with an open fireplace having a chimney and a grate, of a heat-radiating device comprising a substantially horizontal baffle plate constructed to shut off direct communication with the chimney, an enclosure extending downwardly from the front end of the baffle plate and open to the fireplace, an enclosure above the baffle plate near the front end thereof and heat radiating means between the two enclosures, the upper enclosure opening rearwardly to the chimney and means for supporting the baffle plate, the enclosures and the radiating means at the upper end of the fireplace, so that the main part of the fireplace is unobstructed.

12. A radiating attachment for an open fireplace, comprising a baffle plate, an enclosure extending downwardly from one end of the baffle plate and open toward the other end of the plate, an enclosure above the baffle plate and the first enclosure and likewise open toward the other end of the plate and radiating means between the two enclosures extending upwardly therefrom.

JAMES S. NICHOLS.